Feb. 13, 1945.   K. KOBLIGK   2,369,579
CAR BODY
Filed March 5, 1940   2 Sheets-Sheet 1

Inventor:
Kurt Kobligk
By John P. Tarbox
Attorney

Feb. 13, 1945. K. KOBLIGK 2,369,579
CAR BODY
Filed March 5, 1940  2 Sheets—Sheet 2
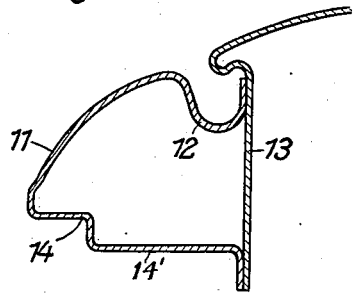
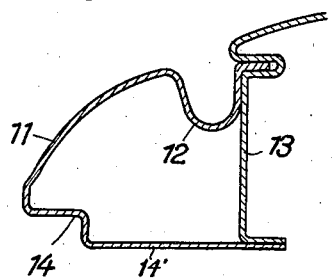
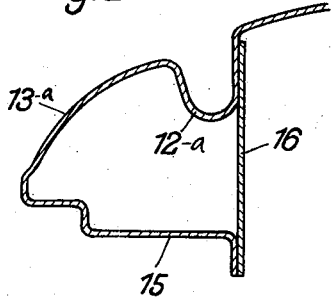
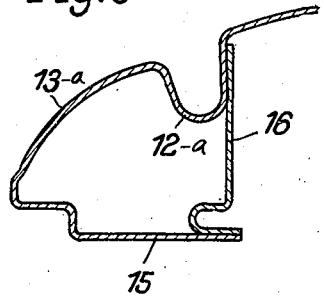
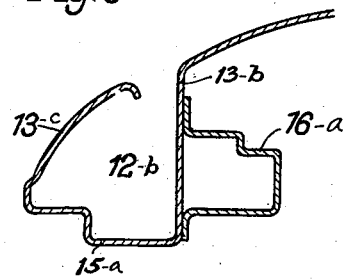
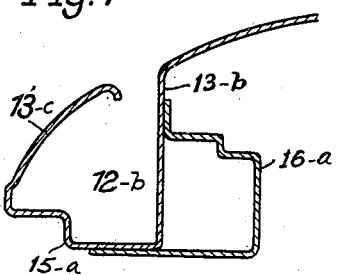
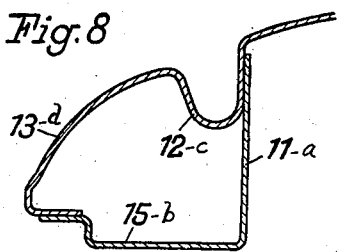
Inventor:
Kurt Kobligk
By John P. Tarbox
Attorney Patented Feb. 13, 1945

2,369,579

UNITED STATES PATENT OFFICE 2,369,579

CAR BODY

Kurt Kobligk, Berlin, Germany; vested in the Alien Property Custodian

Application March 5, 1940, Serial No. 322,290
In Germany March 24, 1939

1 Claim. (Cl. 296—28)

The invention relates to improvements in the construction of car bodies for use on automobiles and other cars, the primary object of the invention being the provision of a car body in which the drip channels are designed so that no separate pressings need be used for them.

According to the invention, either the upper portions of the side panels of car or the side portions of the roof panel or both of them are provided with a channel-like or similar groove or grooves forming a drip channel which—or at least the bottom of which—does not project beyond the external face of the car body.

The invention may be applied to either cars composed of sheet metal panels or pressings, or to cars composed of an either wood or metal framework to which an external sheeting is secured, or to car bodies the panels or other parts of which are made from synthetic plastics.

In the case of car bodies made of either panels or pressings where the side panels are connected with a roof panel, the drip channels are so designed as to either coincide with the line connecting roof and side panel or to be situated close to the latter.

A number of forms of the invention are shown in the attached drawings in which

Figs. 2 to 8 are sectional views on an enlarged scale, approximately on the line 2—2 of Fig. 1, each figure showing a different embodiment.

Figure 1:
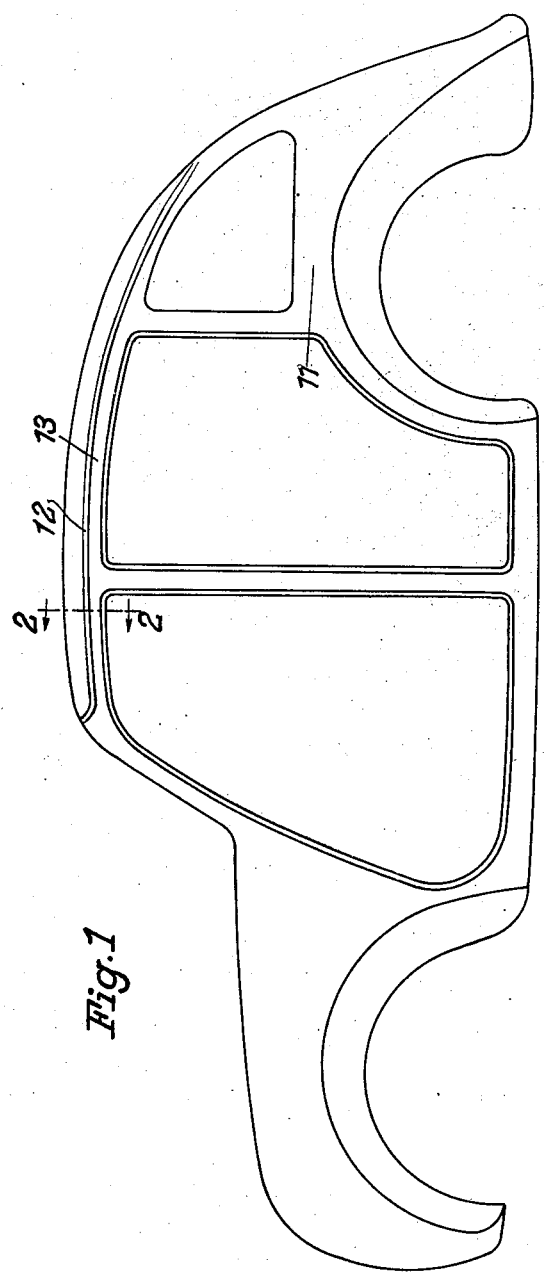
Fig. 1 is an external view of the car body.

In the embodiments shown in Figs. 2 and 3, the roof is provided with a flange 13 extending downwardly.

The side panel is formed at its upper edge with the drip channel 12 and has the rabbet 14 and upper rail 14' above the door or window, and the curved portion 11, between the channel 12 and the rabbet 14. Portions of the inner edges of the side panel, at the inner edge of the drip channel 12 and the inner end of the rail 14', are attached to the flange 13. This relation of the inner side of the upper end of the side panel and the outer end of the roof forms a longitudinal hollow girder.

In the embodiment shown in Figs. 4 and 5, the roof is provided with the drip channel 12—a and the flange 13—a is curved outwardly and downwardly and merges into the upper rail 15 above the door or window. In this form, the side panel has its upper edge portion 16 attached to the roof at the inner edge of the drip channel 12—a and the inner end of the rail 15. This relation of the upper end of the side panel and the outer ends of the roof forms the longitudinal hollow girder.

In the embodiment shown in Figs. 6 and 7, the roof has the depending flange 13—b similar to flange 13 of the form in Figs. 2 and 3, the rail 15—a for the door or window, and the curved flange 13—c similar to the flange 13—a in the form of Figs. 4 and 5. In this form, the inner end of the flange 13—c is spaced from the point on the roof at which the depending flange 13—b is bent downwardly, so as to form the drip channel 12—b. The side panel has its upper end 16—a bent to form three sides of the hollow girder and is attached at two points to the depending flange 13—b of the roof, which forms the fourth side of the girder.

In the embodiment of Fig. 8, the roof has the drip channel 12—c and the downwardly curved flange 13—d, as in the form of Figs. 4 and 5. In this form, the side panel has its upper end 11—a attached to the roof adjacent the inner side of the drip channel 12—c, and has a portion forming the upper rail 15—b above the door or window and attached to the outer lower end of the flange 13—d. This relation of the upper end of the side panel and the roof forms the horizontal hollow girder.

Owing to the absence of separate pressings for the drip channel the number of welds will be reduced and simplified. At the same time, a car body having a box-shaped girder at the lower edges of roof will be formed.

If a sliding roof is provided, the sliding channel for the roof can drain off direct into the drip channel without requiring any separate, long, and expensive roof draining tubes of rubber, as have been used hitherto.

I claim:

In a roof panel for a vehicle body, the combination of a main portion curved in cross-section, and a lateral portion disposed on each side of said main portion, each lateral portion being formed as a hollow box-section comprising the header strip of a door or window opening, with an inner vertical wall extending downwardly from the outer edge of the main portion, a base portion extending outwardly from the lower end of the vertical wall, and an upwardly and inwardly curved portion, said curved portion of the lateral portion being shaped to provide a drip channel for water drained off of the main portion, said channel lying within the outline of the curved juncture of the main portion and the lateral portion.

KURT KOBLIGK.